United States Patent [19]

Senatore

[11] Patent Number: 4,479,837

[45] Date of Patent: Oct. 30, 1984

[54] FILAMENT REIN FOR CEMENT IMPREGNATED WITH RESIN OF THICKENABLE COMPOSITION BASED ON AN ADDUCT OF ALKADIENE POLYMERS AND ACID ANHYDRIDE

[75] Inventor: Guy Senatore, Bartlesville, Okla.

[73] Assignee: Phillips Petroleum Company, Bartlesville, Okla.

[21] Appl. No.: 523,532

[22] Filed: Aug. 16, 1983

Related U.S. Application Data

[62] Division of Ser. No. 355,277, Mar. 5, 1982, Pat. No. 4,423,177.

[51] Int. Cl.³ .................. B65H 81/00; B32B 5/00
[52] U.S. Cl. ................... 156/169; 156/180; 156/332; 428/375
[58] Field of Search .............. 156/169, 175, 180, 332, 156/327; 264/137, 257, 258; 524/251, 379, 389, 531, 433, 436; 525/285; 428/375, 377

[56] References Cited

U.S. PATENT DOCUMENTS

| | | | |
|---|---|---|---|
| 3,225,089 | 12/1965 | Short | 260/537 |
| 3,511,816 | 5/1970 | Dickakian | 524/531 |
| 3,636,141 | 1/1972 | O'Neill et al. | 260/880 |
| 3,821,158 | 6/1974 | Westermann | 260/42.18 |
| 3,952,023 | 4/1976 | Kaiya | 260/346.8 R |
| 4,020,036 | 4/1977 | South | 260/862 |
| 4,080,493 | 3/1978 | Yasui | 525/285 |
| 4,082,817 | 4/1978 | Imaizumi et al. | 260/879 |
| 4,371,635 | 2/1983 | Senatore | 524/399 |

Primary Examiner—Michael Ball
Attorney, Agent, or Firm—Bernhard H. Geissler

[57] ABSTRACT

A thickenable composition for sheet and bulk thermoset molding is described which comprises an adduct of a medium to high vinyl alkadiene polymer with a cyclic or acyclic anhydride of a mono or decarboxylic acid, a thickening agent, an organic peroxide, and a liquid selected from the group consisting of water, liquid alkanols and mixtures thereof. Magnesium oxide and magnesium hydroxide are the preferred thickening agents.

8 Claims, No Drawings

FILAMENT REIN FOR CEMENT IMPREGNATED WITH RESIN OF THICKENABLE COMPOSITION BASED ON AN ADDUCT OF ALKADIENE POLYMERS AND ACID ANHYDRIDE

RELATED APPLICATION

This is a division of application Ser. No. 355,277, filed Mar. 5, 1982, now U.S. Pat. No. 4,423,177.

BACKGROUND OF THE INVENTION

Various compositions useful for thermosetting molding have been described in the art. U.S. Pat. No. 3,821,158, for instance, describes a high vinyl polybutadiene based composition which is used in conjunction with low density polyethylene. Another molding composition based on 1,2-polybutadiene is described in U.S. Pat. No. 3,636,141. This composition comprises a vinyl monomer such as styrene. The low shrinkage of this composition is emphasized in the patent.

THE INVENTION

It is one object of this invention to provide a new thickenable composition based on alkadiene polymers.

Another object of this invention is to provide a thickenable polyalkadiene based composition which is characterized by a high viscosity and by a relatively rapid development of this high viscosity.

These and other objects, advantages, details, features, and embodiments of this invention will become apparent to those skilled in the art from the following detailed description of the invention, the appended claims, and examples including tabular representations of the viscosity/time behavior of the composition of this invention.

In accordance with this invention, a thickenable rubber based thermosetting composition is provided, which comprises an adduct of a medium to high vinyl alkadiene polymer and an anhydride of a mono or dicarboxylic acid, a thickening agent, an organic peroxide, and a thickening additive selected from the group, consisting of water, alkanols, phenols, amines and mixtures thereof. It has been found, in accordance with this invention, that such a composition, while fluid when initially mixed, reaches a viscosity in the order of 100,000 to 1,000,000 poises in one to seven days.

These advantageous properties make the thickenable composition of this invention useful as a sheet molding compound as well as a bulk molding compound. The compositions thus can be used in thermoset molding processes by, e.g., compression, injection, or transfer, to produce such articles as business machine housings, electrical switch boxes, or automotive grills. The thermoset molding of these materials is generally carried out at temperatures above about 149° C. (300° F.), frequently in the range of 149°-204° C. (300°-400° F.).

In addition to the ingredients described, the composition of this invention may contain an unsaturated monomer, mold release agent, coupling agent, filler, and fiber reinforcement. More specifically, the composition contains the above ingredients in quantities that are within the ranges shown in the following table.

| Ingredients | Generally Employed Parts by Weight | Preferably Employed Parts by Weight |
|---|---|---|
| Medium to high vinyl alkadiene adduct | 100 | 100 |
| Unsaturated monomer | 0–200 | 0–100 |
| Filler | 0–1000 | 150–700 |
| Mold release agent | 0–10 | 1–4 |
| Coupling agent | 0–5 | 0–2 |
| Organic peroxide | 1–10 | 2–8 |
| Thickening agent | 0.1–10 | 0.2–4 |
| Thickening additive | 0.1–10 | 0.2–4 |
| Fiber reinforcement | 0–300 | 100–250 |

Furthermore the alkadiene polymer/anhydride adduct can be treated to hydrolyze the anhydride groups to carboxylic acid groups to form a second thickenable thermoset polymer. Hydrolysis can be accomplished by heating the adduct at 35°-204° C. (95°-400° F.), preferably 50°-125° C. (122°-257° F.), in the presence of water, ammonia, alkanols containing 1-18 carbon atoms, phenols containing 6-18 carbon atoms, or amines having 1 or 2 $C_{1-18}$ hydrocarbyl substituents, preferably alkyl substituents containing 1-18 carbon atoms or aromatic substituents containing 6-18 carbon atoms or mixture thereof, with water being preferred. The resulting hydrolyzed adduct can be formulated with the aforementioned ingredients except for the water and/or liquid alkanol to a second thickenable thermoset composition. The resulting compositions have the same advantageous properties and usefulness as the first.

In accordance with another embodiment of this invention, the alkadiene adduct can be employed in pultrusion or filament winding processes. In both cases continuous fibers are pulled through a bath of a resin composition and then, through a die to remove excess composition; the coated fibers are thermoset. The latter is accomplished in the pultrusion process by pulling the coated fibers through a heated die to obtain a cured rod having essentially the die's cross section. In the filament winding process the coated fibers are wound about a mandrel, then thermoset. The composition comprises the alkadiene polymer/anhydride adduct, an organic peroxide, and usually an unsaturated monomer to be described in more detail below. Preferably the composition for the pultrusion and filament winding processes will contain 1-10, most preferred: 2-8 parts by weight of organic peroxide per 100 parts by weight of said adduct. The vinyl monomer when employed will generally be used in the range of 10-150 parts by weight; preferably in the range of 25-100 parts by weight adduct. In addition mold release agents and coupling agents may be included in the composition.

ALKADIENE POLYMER ADDUCT

The alkadiene polymers used in preparing the adducts include linear and radial homopolymers of 1,3-alkadienes containing 4-18 carbon atoms and linear and radial random and block copolymers of 1,3-alkadienes as defined and a monovinyl substituted aromatic hydrocarbon containing from 8 to 18 carbon atoms. Specific examples of such 1,3-alkadienes include 1,3-butadiene, isoprene, 2-ethyl-1,3-butadiene and the like. The monovinyl substituted aromatic hydrocarbons encompass styrene, alpha-methylstyrene, 3,5-diethylstyrene, 4-n-propylstyrene, 4-cyclohexylstyrene, 4-phenylstyrene, 3-benzylstyrene, 2,4,6-trimethylstyrene, 4-decylstyrene, 1-vinylnaphthalene, 8-phenyl-1-vinylnaphthalene and the like. Presently it is preferred to employ linear homopolymers of 1,3-butadiene.

The polyalkadiene segments of the linear or radial random or block copolymers comprise from 99 to about 50 weight % of the total weight of the copolymers with the non-elastomeric (non-alkadiene) segments comprising the remainder. The number average molecular weight of the alkadiene polymers used in preparing the adducts can range from about 500 to 500,000 and more preferably from 1,000 to 50,000.

The number of alkadiene units bonded together in the 1,2 mode of addition in the alkadiene homopolymers used in preparing the adducts is preferably about 40% or more and can range from about 40 to about 95% or more of the total combined alkadiene units.

The number of alkadiene bonds bonded together in the 1,2 mode of addition in the linear or radial random or block copolymers of 1,3-alkadiene and a monovinyl substituted aromatic hydrocarbon used in preparing the adducts is preferably about 60% or more and can range from about 60 to about 95% or more of the total combined alkadiene units.

The vinyl content or percentage of 1,2 mode of addition can be determined by standard techniques. One possibility to determine vinyl content is infrared analysis, as described in U.S. Pat. No. 3,157,605, column 8, lines 34–65.

Suitable polymers employable in the composition of this invention are adducts of alkadiene polymers and cyclic or acyclic anhydrides of mono or dicarboxylic acids containing 4 to 18 carbon atoms. Examples of useful adducts are those between butadiene polymers and maleic anhydride, citraconic anhydride, alkylmaleic anhydride (the alkyl having 1 to 12 carbon atoms), e.g. n-dodecylmaleic anhydride, itaconic anhydride, pyrocinchonic anhydride, and the like. Maleic anhydride adducts are presently preferred because of their ease of synthesis and efficacy in the compositions.

The average number of anhydride groups attached to the polymer adduct is generally in the range of 1 to 10, preferably 1.2 to 4 anhydride molecule structures

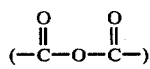

per polymer adduct molecule. The medium to high vinyl polybutadiene adducts are more specifically described in U.S. Pat. Nos. 3,952,023 and 4,082,817. These patents are incorporated herein by reference.

UNSATURATED MONOMER

The unsaturated monomers useful in the composition of this invention are vinyl arenes containing from 8 to 18 carbon atoms, alpha, beta-unsaturated esters containing 4 to 16 carbon atoms, and vinyl and allyl esters containing from 6 to 18 carbon atoms. Examples of such vinyl arenes are styrene, alpha-methylstyrene, 4-methylstyrene, 4-tert-butylstyrene, 4-cyclohexylstyrene, 1-vinylnaphthalene, 1,3-divinylbenzene, and the like, of such alpha, beta-unsaturated esters are n-butyl acrylate, ethyl methacrylate, n-octyl methacrylate, and the like, and of such vinyl and allyl esters are divinyl phthalate, diallyl phthalate, diallyl-4-methylphthalate, and the like. Presently it is preferred to employ styrene in those compositions which include an unsaturated monomer.

FILLER

Fillers are preferably included in the composition of this invention to enhance various properties of the moldings such as flexural modulus, hardness, corrosion resistance, electrical properties, flame retardancy, lower density, reduce warpage, reduce shrinkage, improve flow, and to lower composition costs. Examples of suitable filters are calcium carbonate, talc, mica, clay, wollastonite, aluminum trihydrate, and glass beads and bubbles.

MOLD RELEASE AGENT

The composition of this invention also preferably contains an internal mold release agent to facilitate the removal of the cured composition from the mold. The materials commonly employed for this purpose are metal salts of long chain fatty acids such as zinc stearate and calcium stearate.

COUPLING AGENT

Additionally the composition can contain a coupling agent to enhance the properties of molded articles by promoting bonding and adhesion of the polymer to the filler and/or glass fiber reinforcement. The silanes and titanates which can be employed as coupling agents in accordance with the present invention include vinyltriethoxysilane, gamma-methacryloxypropyl trimethoxysilane, isopropyl trimethacryl titanate, isopropyl isostearoyl dimethacryl titanate, and the like, and mixtures thereof.

ORGANIC PEROXIDE

The thermosetting molding compositions of this invention include an organic peroxide compound as a curing agent for the alkadiene polymer segments. Suitable peroxy compounds include diacyl peroxides, ketone peroxides, peroxydicarbonate peroxyesters, dialkyl peroxides, hydroperoxides, and peroxyketals, preferably containing up to about 30 carbon atoms per molecule. Exemplary organic peroxy compounds include tert-butyl peroxybenzoate, di-tert-butyl peroxide, dicumyl peroxide, diisopropyl peroxydicarbonate, OO-tert-butyl-O-isopropyl monoperoxycarbonate, alpha, alpha'-bis-(tert-butylperoxy)diisopropylbenzene, 2,5-dimethyl-2,5-bis(tert-butylperoxy)hexane, n-butyl-4,4-bis-(tert-butylperoxy)valerate, 1,1-di(tert-butylperoxy)-3,3,5-trimethylcyclohexane, and admixtures thereof.

THICKENING AGENT

The thickening agent is a composition selected from the group consisting of the alkaline earth metal oxides and the alkaline earth metal hydroxides and mixtures thereof. Examples of such thickening agents are calcium hydroxide, magnesium oxide, barium hydroxide, and magnesium hydroxide. The preferred thickening agents are magnesium oxide and magnesium hydroxide and mixtures of the two. These compounds are commercially available products. No specific purity is required for the two ingredients with either the pure ingredients or dispersions thereof being equally suitable.

THICKENING ADDITIVE

An important ingredient of this invention is a thickening additive selected from the group consisting of water, alkanols, phenols, amines and mixtures thereof. The alkanols contemplated for use in this invention are liquids or soluble solid alcohols containing at least one hydroxy functional group, the alkyl radical of which has 1 to 18 carbon atoms. Liquid or soluble solid phenols containing 6-18 carbon atoms and/or amines having 1 or 2 alkyl substituents containing 1-18 carbon atoms or aromatic substituents containing 6-18 carbon atoms, or mixtures thereof may also be used as the thickening additive. The additive is used in quantities that are best related to the number of anhydride groups present in the alkadiene polymer adduct. The thickening additive is used in a quantity of about 0.25 to 5 equivalents per equivalent of anhydride, preferably in a quantity of 0.5 to 2 equivalents per equivalent of anhydride.

FIBER REINFORCEMENT

Lastly fiber reinforcements can also be employed in the composition of this invention to improve strength and impact properties and to limit shrinkage. Typical examples of usable fiber reinforcements are glass, carbon, graphite, polymer, and metal fibers and whiskers.

The most preferred thermosetting compositions of this invention which will vary depending on the method of compounding and end use are defined with these stated qualifications in the following table.

|  | Parts by Weight |
|---|---|
| Maleic anhydride adduct of high vinyl polybutadiene (Mw 3000-30000, 65-90% vinyl, 1-10% maleic anhydride) | 100 |
| Styrene | 0-70 |
| Calcium carbonate | 150-600 |
| Zinc stearate | 2-3 |
| Silane coupling agent, gamma-methacryloxypropyltrimethoxysilane | 0-2 |
| Peroxide, alpha, alpha'-bis(tert-butylperoxy)-diisopropylbenzene | 3-8 |
| Thickening agent, magnesium oxide | 0.4-2 |
| Water | 0.2-1 |
| Fiber reinforcement, glass | 100-250 |

These compositions constitute thickenable, stable, thermoset formulations. The compositions usually are mixed in a manner listed in the following process description to form a fluid paste to which fiber reinforcement is added. The ingredients can be mixed in any order with the following two exceptions. It is preferred that, if an unsaturated monomer is incorporated in the composition, the polymer adduct be first dissolved in said monomer. Secondly, it is further preferred to prevent premature thickening of the paste before the fiber reinforcement can be added and wet-out that either or both the thickening agent or water/alkanol be added last. The resulting compositions are then stored during maturation in receptacles to minimize contamination and loss of unsaturated monomer if present.

EXAMPLE 1-6

The 6 formulations listed in Table I were thoroughly mixed under high shear (Cowles Dissolver-Morehouse Industries, Inc.). The ingredients were mixed into a predissolved solution of polymer adduct in styrene (60% polymer, viscosity @25° C. 32 poises) in the following order: water/methanol, zinc stearate, peroxide, filler, then thickener last. Total mixing time was 5 minutes.

TABLE I

| Run No. | Recipes (Quantities in Parts by Weight) | | | | | |
|---|---|---|---|---|---|---|
|  | 1 | 2 | 3 | 4 | 5 | 6 |
| Polymer adduct (1) | 100 | 100 | 100 | 100 | 100 | 100 |

TABLE I-continued

| Run No. | Recipes (Quantities in Parts by Weight) | | | | | |
|---|---|---|---|---|---|---|
|  | 1 | 2 | 3 | 4 | 5 | 6 |
| Styrene | 67 | 67 | 67 | 67 | 67 | 67 |
| Calcium carbonate (2) | 250 | 250 | 250 | 250 | 250 | 250 |
| Zinc stearate (3) | 3 | 3 | 3 | 3 | 3 | 3 |
| Peroxide (4) | 7 | 7 | 7 | 7 | 7 | 7 |
| Water |  |  | 0.4 |  | 0.4 |  |
| Methanol |  |  |  | 0.8 |  | 0.8 |
| Magnesium oxide (5) |  | 0.5 |  |  | 0.5 | 0.5 |

(1) Maleic anhydride adduct of high vinyl polybutadiene (Mn 19,100, 70.3% vinyl, 1.5% by weight maleic anhydride)
(2) Gama-Sperse 6451 (Georgia Marble Co.)
(3) Synpro ABG (Synthetic Products, a division of Dart Industries)
(4) Vulcup R, alpha, alpha'-bis(tert-butylperoxy)diisopropylbenzene (Hercules)
(5) PG9033, 40% dispersion of magnesium oxide (Plasticolor)

The maturation of the pastes were followed and the results given in Table II. As can be seen from the data, only runs 5 and 6 resulted in a paste that develops significant viscosity after a reasonable period of time. A combination of thickener and liquid containing a hydroxyl functional group is required for maturation.

TABLE II

| Run No. | Paste Viscosity (Poises @ 25° C.)[1] | | | | | |
|---|---|---|---|---|---|---|
|  | 1 | 2 | 3 | 4 | 5 | 6 |
| Initial (°C.)[2] | 96(37) | 93(40) | 96(38) | 101(37) | 99(39) | 106(38) |
| 4 hours | 196 | 220 | 220 | 260 | 288 | 154 |
| 3 days | 228 | 256 | 308 | 512 | 1 210 | 59 200 |
| 4 days | 216 | 244 | 328 | 500 | 3 100 | 84 000 |
| 5 days | 216 | 244 | 396 | 528 | 7 920 | 104 000 |
| 10 days | 228 | 252 | 808 | 648 | 11 000 | 232 000 |
| 17 days | 256 | 284 | 2 260 | 704 | 456 000 | 408 000 |
| 24 days | 276 | 276 | 3 200 | 680 | 976 000 | 392 000 |

[1] Measured on Brookfield viscometer Model HBT.
[2] Viscosity and temperature of paste after mixing.

EXAMPLES 7-11

The 5 formulations listed in Table III were thoroughly mixed under high shear following the procedure for examples 1-6 before being fabricated to sheet molding compounds. Maturation was monitored by retention of a sample of each paste and is listed in Table IV.

TABLE III

| Run No. | Recipes (Quantities in Parts by Weight) | | | | |
|---|---|---|---|---|---|
|  | 7 | 8 | 9 | 10 | 11 |
| Polymer Adduct[1] | 100 | 100 | 100 | 100 | 100[2] |
| Styrene | 67 | 67 | 67 | 67 | — |
| Calcium carbonate[3] | 250 | 333 | 417 | 500 | 150 |
| Zinc stearate[4] | 3 | 3 | 3 | 3 | 2 |
| Peroxide[5] | 7 | 7 | 7 | 7 | 4 |
| Water | 0.4 | 0.4 | 0.4 | 0.4 | 1 |
| Magnesium oxide[6] | 0.6 | 0.6 | 0.6 | 0.6 | 2 |
| Fiber glass reinforcement[7] | 166 | 199 | 231 | 264 | 101 |

[1] Maleic anhydride adduct of high vinyl polybutadiene ($M_n$ 24,500, 72.5% vinyl, 1% by weight maleic anhydride)
[2] Maleic anhydride adduct of high vinyl polybutadiene ($M_n$ 4,900, 63.1% vinyl, 6% by weight maleic anhydride)
[3] Gama-Sperse 6451 (Georgia Marble Co.)
[4] Synpro ABG (Synthetic Products, a division of Dart Industries)
[5] Vulcup R, alpha, alpha'-bis(tert-butylperoxy)diisopropylbenzene (Hercules)
[6] PG9033, 40% dispersion of magnesium oxide (Plasticolor)
[7] OCF 951-113, 1 inch chopped roving, 28% by weight of total compound (Owens Corning Fiberglass)

TABLE IV

| Run No. | Paste Viscosity (Poises @ 25° C.)[1] | | | | |
|---|---|---|---|---|---|
|  | 7 | 8 | 9 | 10 | 11 |
| Initial (°C.)[2] | 232(37) | 360(41) | 440(45) | 712(51) | 720(41) |
| 1 day | 24 000 | 2 380 | 119 000 | 1 360 000 | 24 000 |

TABLE IV-continued

| | Paste Viscosity (Poises @ 25° C.)[1] | | | | |
|---|---|---|---|---|---|
| Run No. | 7 | 8 | 9 | 10 | 11 |
| 2 days | 126 000 | 12 000 | 205 000 | | |
| 3 days | 608 000 | 52 800 | 1 500 000 | | 35 000 |
| 7 days | | 936 000 | | | 53 000 |

[1]Measured on Brookfield viscometer Model HBT
[2]Viscosity and temperature of paste after mixing Upon maturation Runs 7-10 were molded at 165° C. and Run 11 at 177° C. in a 6 inch square positive pressure mold at 1100 psi for 3-5 minutes. Mechanical strength properties, determined on 6×0.5×0.125 inch strips prepared from the moldings, are given in Table V. The sheet molding compound formulations exhibited the high strength and exceptionally high heat distortion temperature for thermoset composites of this type.

TABLE V

| | Mechanical Properties | | | | |
|---|---|---|---|---|---|
| Run No. | 7 | 8 | 9 | 10 | 11 |
| Flexural modulus, MPa | 10 779 | 11 440 | 11 129 | 11 252 | 8 927 |
| Flexural strength, MPa | 185.7 | 166.5 | 143.7 | 152.9 | 154.1 |
| Tensile break, MPa | 107.1 | 86.3 | 74.8 | 69.0 | 66.1 |
| Notched Izod impact, J/m | 997 | 884 | 550 | 969 | 1 226 |
| Heat distortion, °C. @ 1820 KPa | >350 | 355 | 375 | 370 | >400 |

I claim:

1. Pultrusion process comprising
   (a) pulling continuous fibers through a bath of a composition comprising an adduct of a medium to high vinyl alkadiene polymer, said polymer having about 60 to about 95% of the alkadiene units bonded in the 1,2-mode, and a cyclic or acyclic anhydride of a mono or dicarboxylic acid, a thickening agent selected from the group consisting of alkaline earth metal oxides, alkaline earth metal hydroxides and mixtures thereof, and an organic peroxide and a thickening additive selected from the group consisting of water, alkanols, phenols, amines and mixtures thereof such as to produce fibers coated with said composition,
   (b) pulling the fibers so coated through a die to remove excess composition,
   (c) heating the fibers of step (b) at a temperature above the activation temperature of the organic peroxide to crosslink and harden the composition.

2. Process of claim 1 comprising pulling a plurality of said continuous fibers simultaneously through said bath and said die.

3. Process of claim 2 wherein said fibers leaving said die are pulled through a heated die to produce a rod having essentially the cross section of said heated die, wherein said heated die is operated at a temperature high enough to cause at least some of said crosslinking and hardening.

4. Process of claim 1 wherein said composition further comprises an unsaturated monomer selected from the group consisting of vinyl arenes, alpha,beta-unsaturated esters, and vinyl and allyl esters.

5. Process of claim 1 wherein said fibers leaving said die are pulled through a heated die to produce a rod having essentially the cross section of said heated die, wherein said heated die is operated at a temperature high enough to cause at least some of said crosslinking and hardening.

6. Filament winding process comprising
   (a) coating one or more continuous fibers with a composition comprising pulling continuous fibers through a bath of a composition comprising an adduct of a medium to high vinyl alkadiene polymer, said polymer having about 60 to 95% of the alkadiene units bonded in the 1,2-mode, and a cyclic or acyclic anhydride of a mono or dicarboxylic acid, a thickening agent selected from the group consisting of alkaline earth metal oxides, alkaline earth metal hydroxides and mixtures thereof, and an organic peroxide and a thickening additive selected from the group consisting of water, alkanols, phenols, amines and mixtures thereof such as to produce fibers coated with said composition,
   (b) winding the coated fiber or fibers onto a body,
   (c) subjecting the wound fibers to curing conditions.

7. Process of claim 6 wherein said body is a mandrel.

8. Process of claim 6 wherein said step (c) is carried out by thermosetting said coating on said fiber or fibers.